(12) United States Patent
Doerr

(10) Patent No.: US 6,212,315 B1
(45) Date of Patent: Apr. 3, 2001

(54) CHANNEL POWER EQUALIZER FOR A WAVELENGTH DIVISION MULTIPLEXED SYSTEM

(75) Inventor: Christopher Richard Doerr, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/111,138

(22) Filed: Jul. 7, 1998

(51) Int. Cl.[7] ............................. G02B 6/26; G02B 6/28; G02B 6/42; H04J 14/02
(52) U.S. Cl. ........................... 385/31; 385/15; 385/24; 385/37; 385/39; 385/45; 359/124; 359/127
(58) Field of Search ................................. 385/15, 24, 27, 385/31–37, 43, 45, 46; 359/124, 127, 131

(56) References Cited

U.S. PATENT DOCUMENTS

| | | | |
|---|---|---|---|
| 5,519,796 | * 5/1996 | Li et al. | 385/24 |
| 5,710,848 | * 1/1998 | Dumais et al. | 385/43 |
| 5,912,750 | * 6/1999 | Takeda et al. | 359/124 |
| 5,953,467 | * 9/1999 | Madsen | 385/15 |
| 6,049,640 | * 4/2000 | Doerr | 385/15 |

\* cited by examiner

*Primary Examiner*—Audrey Chang
(74) *Attorney, Agent, or Firm*—John A. Caccuro

(57) ABSTRACT

A dynamically and chromatically variable transmissivity apparatus (e.g., a channel equalizer or an add-drop circuit) controls channel powers in wavelength-division multiplexed systems. The input WDM signal is split into two components, in one component a phase shift is added to the wavelengths needing equalizing, the two signal components are then recombined. The phase shift added at each wavelength determines the amount of equalization obtained for that wavelength. For a decrease in equalization (i.e., attenuation) range the apparatus exhibits a decrease in insertion loss.

25 Claims, 5 Drawing Sheets

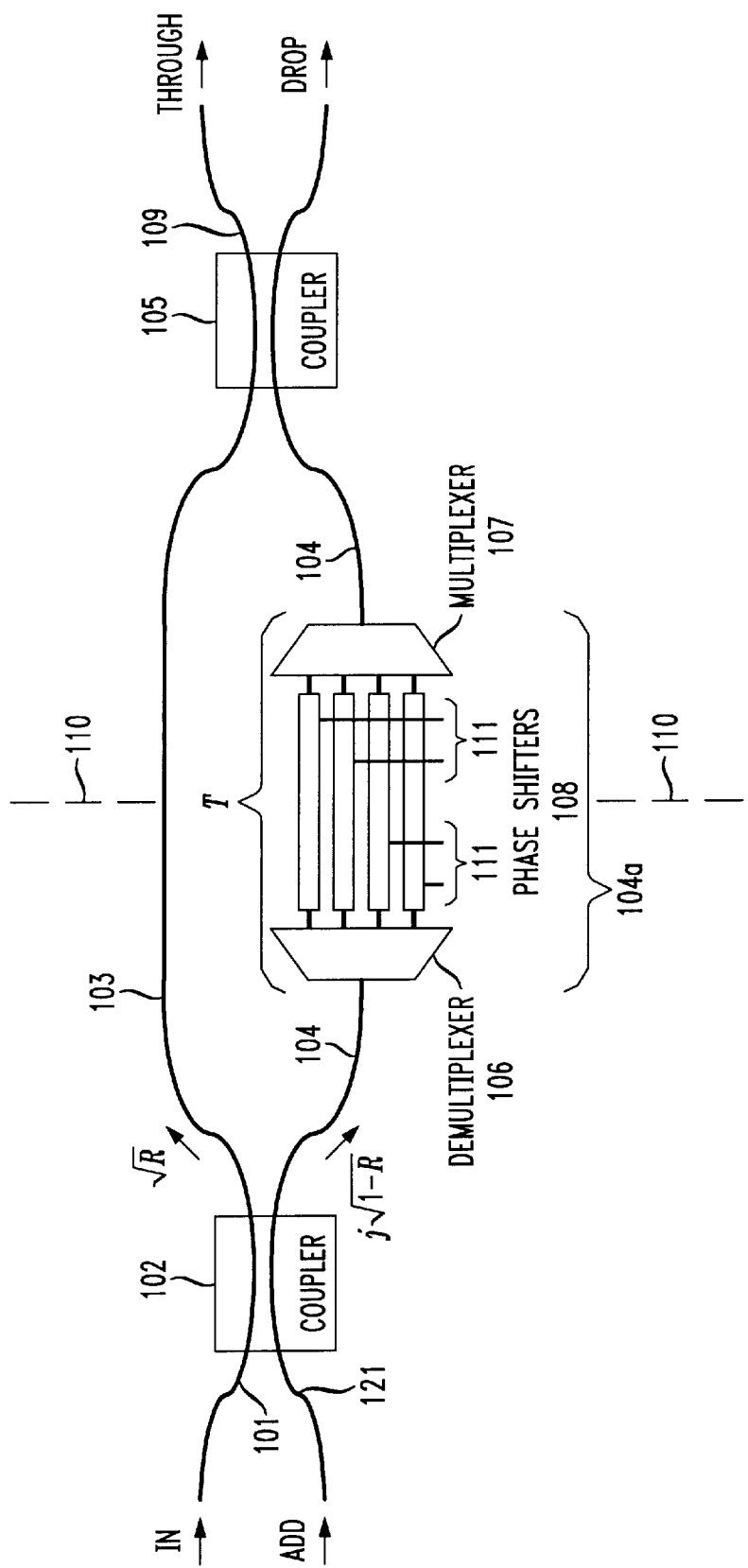

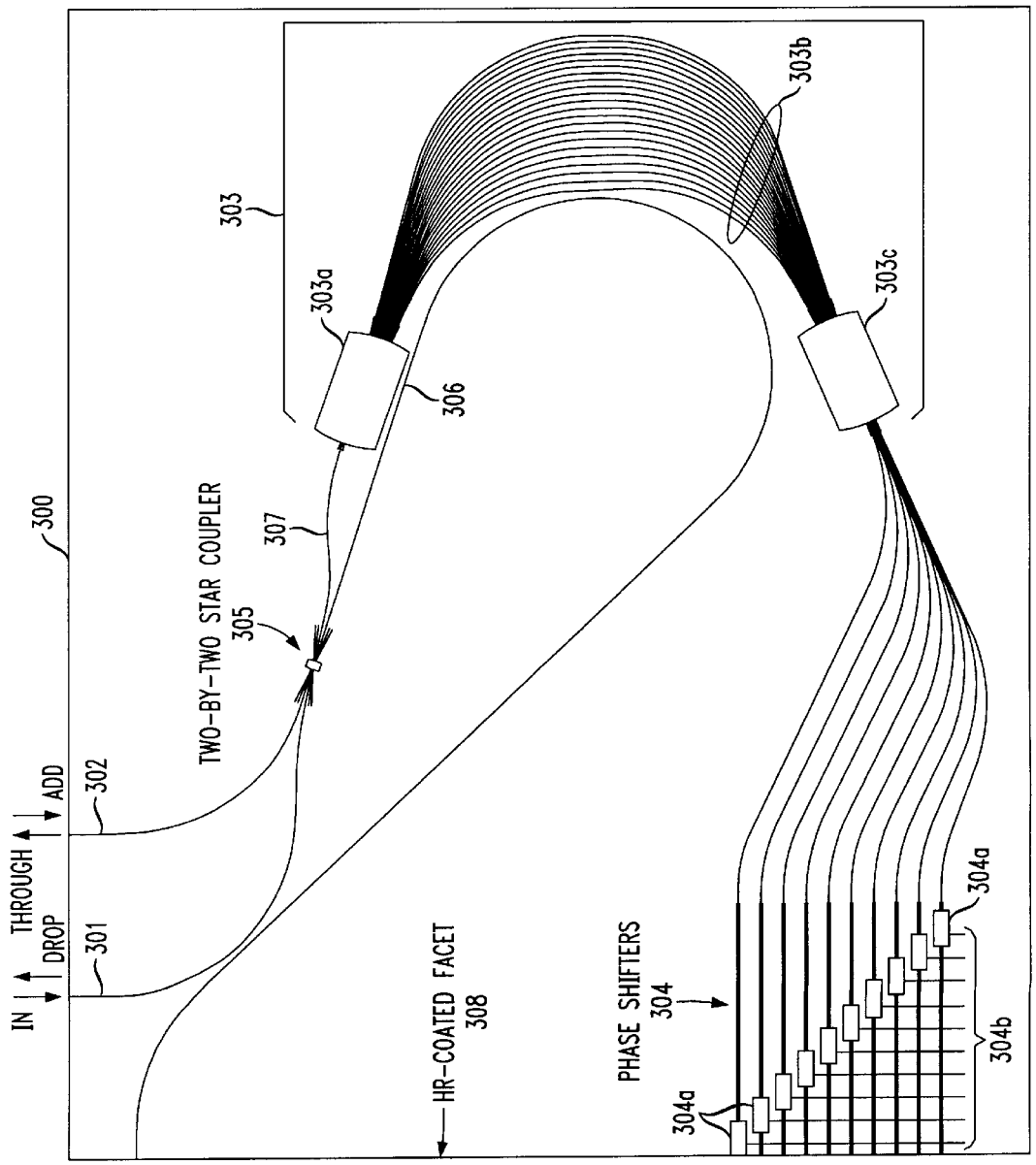

CHANNEL POWER EQUALIZER FOR A WAVELENGTH DIVISION MULTIPLEXED SYSTEM

TECHNICAL FIELD OF THE INVENTION

This invention relates to Wavelength Division Multiplexed (WDM) systems and, more particularly, to a channel power equalizer for a WDM system.

BACKGROUND OF THE INVENTION

In wavelength-division mutiplexed (WDM) networks, a low-loss device that can dynamically equalize the channel powers is needed to compensate for residual gain ripple in the optical amplifiers, incorrect added channel powers in optical add/drops, and sudden channel-power changes. Devices that can dynamically equalize the powers on a broad spectral feature basis include Mach-Zehnder filters[1], acoustooptic filters[2, 3], holograms[4], and micro-mechanically driven mirrors[5]. (Note, the reference number (s) identified in brackets, e.g., [4], indicates the position of that reference(s) in the reference list in the attached Appendix). Devices that can dynamically equalize the power on a channel-by-channel basis conventionally consist of a demultiplexer, an array of programmable attenuators, and a multiplexer (or power combiner)[6, 7]. However, the transmission loss of a demultiplexer-multiplexer pair, 1/T (where T is the transmissivity of the pair), is often too high for many networks.

What is needed is an improved channel-by-channel power equalizer that can achieve a low insertion loss by sacrificing attenuation range.

SUMMARY OF THE INVENTION

My invention is a dynamically and chromatically variable transmissivity apparatus (e.g., a channel equalizer) which controls the power level of wavelength signals (e.g., channel powers) in wavelength-division multiplexed (WDM) systems. When the WDM signal includes wavelengths grouped into a plurality of wavelength channels, the apparatus functions as a WDM channel equalizer. The input WDM signal is split into two components, in one component a phase shift is added to the wavelengths needing equalization, the two signal components are then recombined. The phase shift added at each wavelength determines the amount of loss compensation or equalization obtained for that wavelength. For a decrease in attenuation (i.e., equalization) range the device exhibits a decrease in insertion loss.

More particularly, a chromatically variable transmissivity optical apparatus comprises 1) a first coupler having an input port for receiving a Wavelength Division Multiplexed (WDM) signal and two output ports for outputting first and second WDM signals; 2) a second coupler having two input ports and an output port for outputting an equalized WDM signal; 3) a first optical path for coupling a first WDM signal from the first output port of the first coupler to a first input port of the second coupler; 4) a second optical path for coupling the second WDM signal from a second output port of the first coupler to an input of a wavelength selective phase shifter apparatus for providing a phase shift to one or more wavelengths of the second WDM signal; 5) a third optical path for coupling the phase shifted second WDM signal from an output of the phase shifter apparatus to a second input port of the second coupler; and wherein the second coupler combines the first WDM signal with the phase shifted second WDM signal to form the equalized WDM signal.

According to another feature, the size of the apparatus is substantially reduced when it is implemented as a reflective chromatically variable transmissivity optical apparatus which includes a reflective facet at the midpoint of the selective phase shifter apparatus to reflect optical signals back their source. The incoming WDM signal would then be inputted to one input port of the input coupler and the equalized WDM signal would then be outputted from another input port of the input coupler.

According to other features, a variety of couplers and wavelength selective phase shifter apparatuses may be utilized. The apparatus can also be implemented using bulk components or using an integrated optical device.

BRIEF DESCRIPTION OF THE DRAWING

In the drawing,

FIG. 1 shows an illustrative block diagram of a chromatically variable transmissivity optical apparatus (e.g., channel equalizer) for use with Wavelength Division Multiplexed (WDM) signals;

FIG. 3 shows the waveguide and metals layout of a reflective WDM equalizer;

DETAILED DESCRIPTION

Figure 2A:
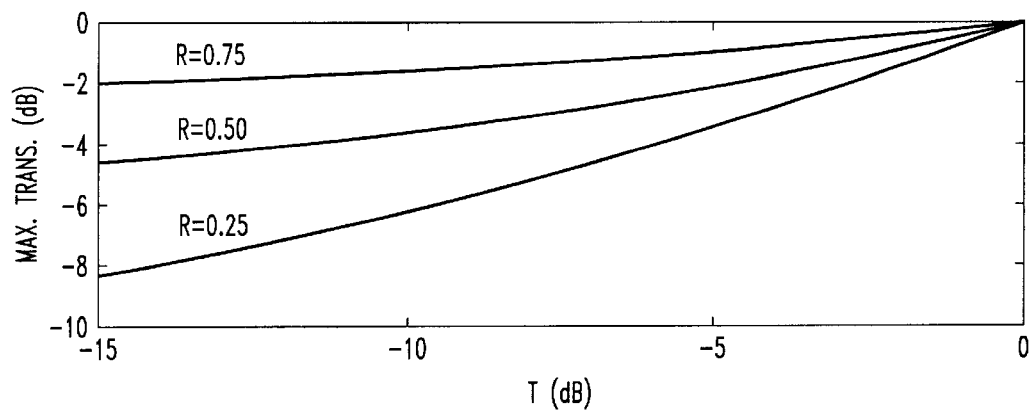
FIG. 2 shows calculated plots of maximum achievable transmissivity and attenuation range vs. the total transmissivity of the demultiplexer, phase shifter set, and multiplexer.

In the following description, each item or block of each figure has a reference designation associated therewith, the first number of which refers to the figure in which that item is first described (e.g., 101 is first described in FIG. 1).

Shown in FIG. 1 is an illustrative block diagram of a dynamically and chromatically variable transmissivity apparatus (channel equalizer) for controlling channel powers in wavelength-division multiplexed (WDM) systems. In the apparatus, a decrease in attenuation range can be traded for a decrease in insertion loss. The WDM signal channels enter the coupler 102 from the left port 101. The coupler 102 splits the WDM signal into the signal components $\sqrt{R}$ and $j\sqrt{1-R}$ which are sent to the upper and lower arms, 103 and 104, respectively, and are then recombined in the second coupler 105, having the same splitting ratio as coupler 102. The upper arm 103 is a simple waveguide, while the lower arm 104 includes a wavelength selective phase shifter apparatus 104a which contains a demultiplexer 106 and multiplexer 107 connected by an array of programmable phase shifters 108. A programmable phase shifter is a device whose effective path length can be controlled externally. The array of programmable phase shifters 108 illustratively includes only four units, each of which is externally controlled via a control lead 111.

Assuming the couplers and waveguides have no excess loss, the transmissivity between the top left input port 101 and top right output port 109 is $$\{R+(1-R)\sqrt{T}\cos[\phi(p)]\}^2 \qquad (1)$$

where $\phi(p)$ is the phase of the pth phase shifter and T is the transmissivity through the lower arm 104. Thus the attenuation range (ratio of maximum to minimum attenuation) is $$\left[\frac{R+(1-R)\sqrt{T}}{R-(1-R)\sqrt{T}}\right]^2 \qquad (2)$$

Figure 2B:
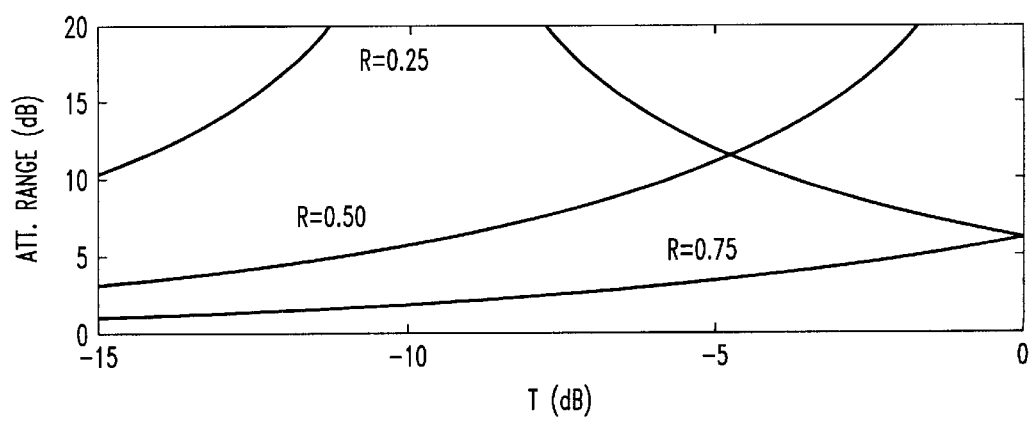
Figure 5A:
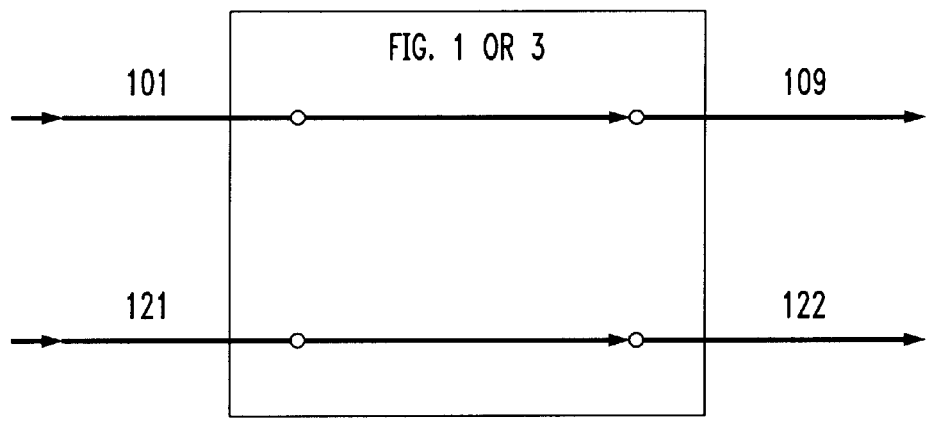
FIG. 5 shows the apparatus of FIGS. 1 and 3 used as a through circuit FIG. 5a (180 degrees in phase shifter) or as an add/drop (or cross-connect) circuit FIG. 5b (0 degrees in phase shifter).
Figure 5B:
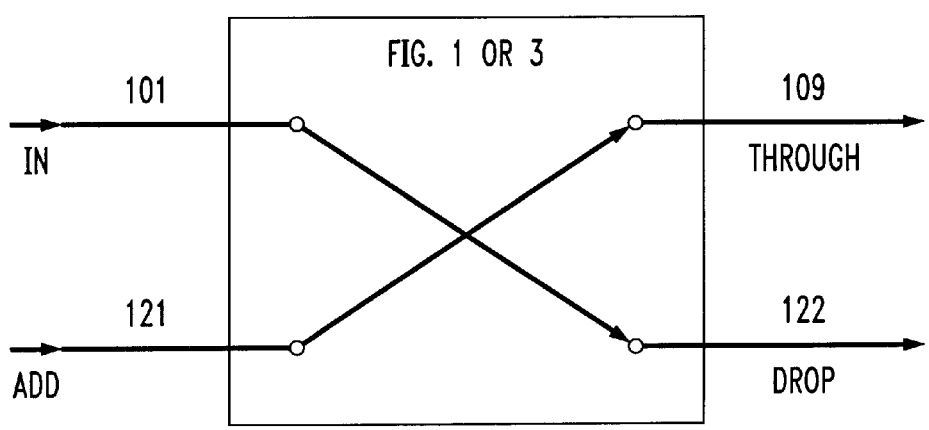

For equation (2), the maximum transmissivity ($\phi=0$) and attenuation range vs. T for various R are plotted in FIG. 2a and FIG. 2b, respectively. As one can see, my inventive equalizer can have significantly higher maximum transmissivity than T, the maximum transmissivity of the conventional channel-by-channel equalizer. For example, if R=0.5, and the demultiplexer plus phase shifter plus multiplexer loss is 10 dB, then the total device loss is only 3.6 dB and can provide an attenuation range of 5.7 dB. It should be noted that decreasing the attenuation range of the equalizer decreases the insertion loss of the equalizer. Interestingly, even when R is chosen to make the attenuation range infinite, $$R=\sqrt{T}/(1+\sqrt{T}) \qquad (3)$$

i.e., an add/drop wavelength circuit, the maximum transmissivity of the proposed scheme is still higher than that of a conventional add/drop circuit, approaching a value of 6 dB better for small T. With reference to FIG. 1, in an add/drop apparatus the port 121 would be the add port and port 122 the drop port. Shown in FIG. 5 is the apparatus of FIGS. 1 and 3 used as a through circuit FIG. 5a (180 degrees in phase shifter 104a) or as an add/drop (or cross-connect) circuit FIG. 5b (0 degrees in phase shifter 104a). In FIG. 5a, to continue or throughput one or more wavelengths (or channels), e.g., λ1, from port 101 to port 109, the phase shift of phase shifter 104a must be 180 degrees for that wavelength λ1. Thus, if more than one wavelength (or channel) are to be throughput the phase shift of phase shifter 104a must be 180 degrees for each of those wavelengths. In contrast, in FIG. 5b, to drop or cross-connect one or more wavelengths, e.g., λ2, from port 101 to port 122, the phase shift of phase shifter 104a must be 0 degrees for that wavelength λ2. This means wavelength λ2 does not appear at port 109. Again, if more than one wavelength (or channel) is to be dropped the phase shift of phase shifter 104a must be 0 degrees for each of those wavelengths to be dropped. This cross-connect mode of FIG. 5b also enables a new wavelength λ2 (or channel) is to be added at port 121 and appear at port 109 along with the throughput wavelengths from port 101. If more than one wavelength (or channel) is to be added, they are added at port 121 and appear at port 109. Again, the phase shift of phase shifter 104a must be 0 degrees for the more than one added wavelength.

A convenient value for R is 0.5, because then one can make a reflective arrangement by cutting the device in half with a mirror placed along the axis of symmetry (i.e., 110 of FIG. 1). Such a reflective-type arrangement is shown in FIG. 3 and will be discussed in a later paragraph. In such a case signals enter input port 101 and exit through input port 121 of coupler 102. Among many advantages to a reflective design are reductions of both size and required phase-shifting power by 50% and the elimination of the need to wavelength-align the demultiplexer and multiplexer units.

FIG. 3 shows the waveguide and metals layout of a reflective-type WDM equalizer. In FIG. 3 the WDM equalizer 300 is a reflective design made in Indium Phosphide (InP). The demultiplexer/multiplexer 104 is implemented as a conventional Waveguide Grating Router 303 (WGR) [8–10] with 10 channels spaced by 100 GHz, 22 grating arms, and a free-spectral range of 1600 GHz; the phase shifters 304 are p-i-n junctions[11]; and the coupler 305 is a two-by-two star coupler[12]. The WGR 303 includes WGR star couplers 303a and 303c connected by a plurality of waveguide arms 303b, each arm corresponding to a different passband. The optical signals enter the top left port 301. Half the coupler 305 signal power proceeds down the long curving waveguide 306 (the "non-filtered arm") reflects off the left-hand facet 307 (reflective or mirrored), and returns. The other half of the coupler 305 signal power proceeds over waveguide 307 (the "filtered arm"), is demultiplexed by the WGR 303, proceeds through the phase shifters 304, reflects off the left-hand facet 307, and is remultiplexed by the WGR 303. The effective path lengths of the non-filtered and filtered arms are equal to within a few microns. The returning powers interfere in coupler 305, and the amplitude of each passband that is sent to the top right port 302 is controlled by one of the phase shifters 304. The amplitude of a particular passband p is dependent on the phase shift $\phi(p)$ of the pth phase shifter, in accordance with equation (1). The phase shift of each of the 10 phase shifters 304 can be adjusted by controlling its corresponding heater 304a via a current control signal provided over its signal path 304b.

WGR Design

The fabrication steps for producing the WDM equalizer 300, implemented using WGR technology, are as follows: first, on an n-type InP substrate wafer is grown a 0.36-$\mu$m layer of InGaAsP (bandgap graded from 1.04 to 1.30 $\mu$m), a thin InP stop-etch, and a 0.08-$\mu$m layer of InGaAsP (bandgap 1.30 $\mu$m). The waveguides are wet-etched into the rib and then buried in 0.9 $\mu$m of InP. Wet-etched waveguides are chosen because of their relatively low loss, ease of burying, and reproducibility. An $SiO_2$ layer is put down over all the waveguides except for 70-$\mu$m wide openings over the 1.0-mm long, 90-$\mu$m spaced phase shifters, which are aligned to the <1$\bar{1}$0> direction; and then 0.3 $\mu$m of p-doped InP plus a quaternary cap layer plus a sacrificial InP layer are grown on top. Then 18-$\mu$m wide chrome-gold stripes with bonding pads are deposited on top of the phase shifters. The sacrificial top layer of InP is etched off immediately before the metal deposition to provide a pristine surface for uniform current injection across the phase shifter. Finally, using the electrodes as a mask, the p-doped InP is wet-etched down ~0.3 $\mu$m to increase the current confinement. After cleaving, a high-reflection coating was deposited on the left-hand facet. The resulting normalized transverse index step of the waveguides is 0.0086, and the bend radii are 720 $\mu$m. The phase shifters are operated by forward current injection with a phase shift of ~−2π/(15 mA).

Because the undercut of our wet-etched waveguides is 0 to 0.35 $\mu$m, we chose as the coupler 305 a two-by-two star coupler[12]. The splitting ratio of the star coupler 305 is insensitive to symmetric waveguide etching errors, unlike evanescent couplers and multi-mode interference couplers. A precise splitting ratio is important because with the reflective design of FIG. 3, deviation of the coupler 305 splitting ratio from 50/50 results in excess loss. For a 50/50 two-by-two star coupler 305, the angular separation between waveguides is π/ka, and the free-space region radius is ~$ka^2/\pi$, where k is the propagation constant in the slab, and a is the waveguide spacing at the free-space region ends. The smaller a is, the lower the loss, but also the less the tolerance to defects that do not match the waveguide periodicity. For the design here, a=3.25 $\mu$m.

To minimize distortions of the through-passing optical signals, one would like to make the passbands as flat as possible. If the device is required to provide only small changes in attenuation between neighboring passbands, then the flatness can be accomplished by designing the WGR 300 to have coupling between the waveguides at the bottom center of FIG. 3 where they connect to the WGR star coupler 303c. This in turn is generally accomplished by having a small grating arm number to WGR free-spectral range over passband spacing ratio. If the WGR 300 device is required to provide large changes in attenuation between neighboring passbands, then one can either use multiple passbands per channel or design the WGR 300 to have rectangular passbands, realizing, however, that such flattening increases the WGR 300 loss. For the WGR 300 device of FIG. 3, the multiple passbands per channel coupling approach was used.

Test Results

FIG. 4 shows measured fiber-to-fiber transmissivity of the WGR 300 equalizer vs. wavelength of TE-polarized light for various phase-shifter settings. Illustratively, two lensed fibers (not shown) coupled light into port 301 and out of port 302 of equalizer WGR 300, and the 10 phase shifter heaters 304a were connected via paths 304b to 10 computer-controlled current drivers (not shown). Because the non-filtered arm 306 is several mm away from the phase shifters 304, the slight heat generated by driving a phase shifter does affect all the passband amplitudes slightly. This interaction was mostly computer-compensated by adding a small percentage of each phase shifter current to the other phase-shifter currents. A better solution would be to use reverse voltage to drive the phase shifters, which generates no heat; but the voltages to achieve $2\pi$ are greater than 20 V.

In FIG. 4, the 10 phase-shifter currents ranged from 0 to ~16 mA. The plots were obtained by sending the spontaneous emission from an Erbium-doped fiber amplifier in one port 301 of the equalizer and measuring the exiting radiation from the other port 302 with an optical spectrum analyzer, normalizing the measurement to the direct spontaneous emission spectrum. Resolution bandwidth=0.1 nm. It is envisioned that each passband would be centered on a WDM channel.

Figure 4A:
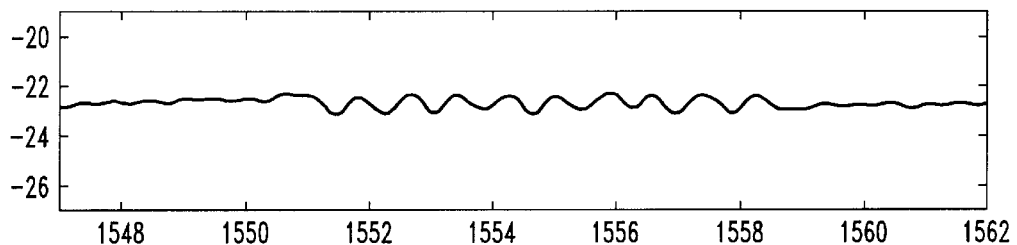
FIG. 4 shows measured fiber-to-fiber transmissivity of the equalizer vs. wavelength of TE-polarized light for various phase-shifter settings.
Figure 4B:
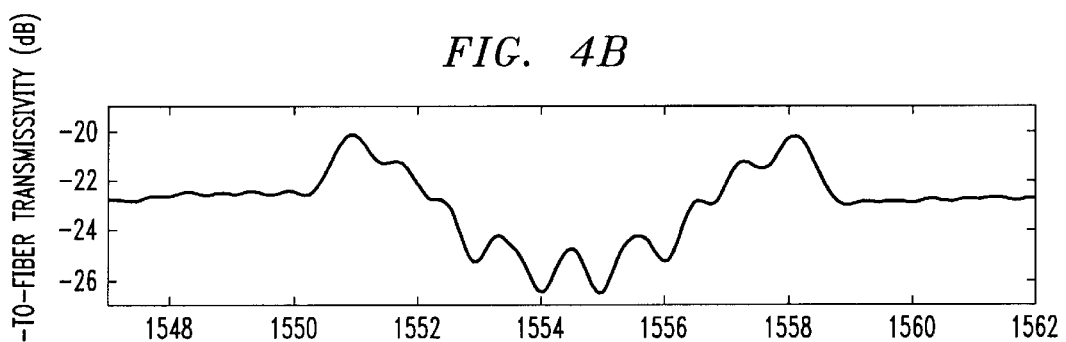
Figure 4C:
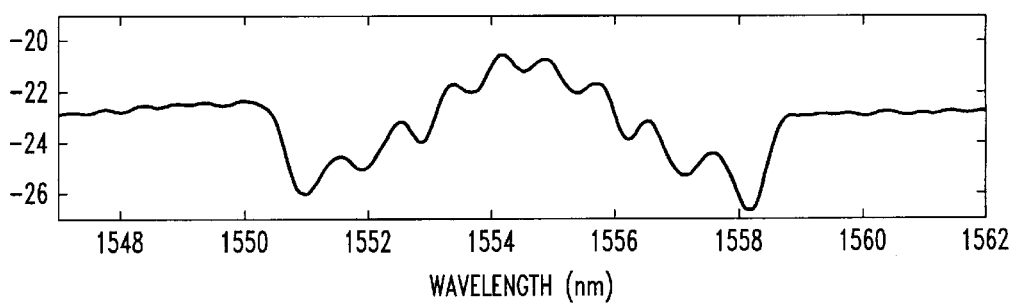

FIG. 4a shows the case when all the passband amplitudes (the peaks of the bumps) are set near the middle of the range. Note that there are two possible phases of the phase shifters for each level setting (modulo $2\pi$), except for the very ends of the attenuation range; in FIG. 4a all the phases are the same. FIGS. 4b and 4c show two demonstrations of more gradual changes in power level vs. wavelength. The phase shifter 304 for each passband was adjusted to make the traces as symmetric as possible, but the achievable symmetry was limited by the variations in passband coupling due to the fact that some of the waveguides at the bottom center of FIG. 3 bend before they are fully decoupled. The transmissivity for transverse-magnetic (TM) polarized light, FIG. 4c, is similar to that of FIG. 4b except that the response is shifted to shorter wavelengths by ~3.2 nm, and the loss is slightly higher (due to increased bend loss in the unfiltered arm for TM polarized light).

The break-down of the device losses is as follows: the facet for the input/output ports 301 and 302 was not anti-reflection coated, so the estimated fiber coupling loss per connection is ~5 dB. The estimated excess loss of the two-by-two star coupler 305 is 1 dB per pass, and the estimated loss of the long curving waveguide 306 is 2 dB per pass. From the measured attenuation range of ~6.5 dB and FIG. 2, one can deduce that the round-trip loss through the WGR 303 and phase shifters 304 is ~8.9 dB plus the round-trip loss through the long curving waveguide, i.e., ~13 dB. Although the many losses associated with this Indium Phosphide (InP) device 300 do not fit with the requirement for a low-loss device, we note that if this device were made in silica with an evanescent coupler instead of the 2 by 2 star coupler and thermooptic phase shifters instead of the current-injection phase shifters, the total device loss could facilely approach the values set forth in FIG. 2. In addition, achieving polarization independence would be easier in silica, and silica waveguides avoid the high nonlinearity present in typical InP waveguides[13]. However, the response time of the thermooptic phase shifters would be slow compared to the InP ones.

The above described chromatically variable transmissivity optical apparatus (or channel power equalizer) can be implemented using discrete bulk optical components as well as being formed as an integrated optics device. The couplers may be selected from a group of couplers including at least an evanescent coupler, a 2 by 2 star coupler, a multimode interference coupler, a fused fiber coupler, a mixing rod coupler, an integrated-optic directional coupler, a beam splitter, a Y-branch, and a GRIN rod directional coupler. Moreover, the wavelength selective phase shifter apparatus could be implemented using optical wavelength filters, a combination of optical multiplexer, demultiplexer, and wavelength selective array of phase shifters where the multiplexer/demultiplexer can be implemented using Waveguide Grating Routers (WGRs). The reflective facet could also be implemented using a mirrored surface.

Thus, what has been described is merely illustrative of the application of the principles of the present invention. Other arrangements and methods can be implemented by those skilled in the art without departing from the spirit and scope of the present invention.

APPENDIX

REFERENCES

[1] K. Inoue, T. Kominato, and H. Toba, "Tunable gain equalization using a Mach-Zehnder optical filter in multi-stage fiber amplifiers," *IEEE Photon. Technol. Lett.*, vol. 3, pp. 718–720, 1991.

[2] S H. Huang, X. Y. Zou, S.-M. Hwang, A. E. Willner, Z. Bao, and D. A. Smith, "Experimental demonstration of dynamic network equalization of three 2.5 Gb/s WDM channels over 1000 km using acoustooptic tunable filters," *IEEE Photon. Technol. Lett.*, vol. 8, pp. 1243–1245, 1996.

[3] H. S. Kim, S. H. Yun, H. K. Kim, N. Park, and B. Y. Kim, "Actively gain-flattened erbium-doped fiber amplifier over 35 nm by using all-fiber acoustooptic tunable filters," *IEEE Photon. Technol. Lett.*, vol. 10, pp. 790–792, 1998.

[4] M. C. Parker, A. D. Cohen, and R. J. Mears, "Dynamic holographic spectral equalization for WDM," *IEEE Photon. Technol. Lett.*, vol. 9, pp. 529–531, 1997.

[5] J. E. Ford and J. A. Walker, "Dynamic spectral power equalization using micro-optomechanics," submitted to *Photonics Technology Letters*.

[6] F. Shehadeh, R. S. Vodhanel, M. Krain, C. Gibbons, R. E. Wagner, and M. Ali, "Gain-equalized, eight-wavelength WDM optical add-drop multiplexer with an 8-dB dynamic range," *IEEE Photon. Technol. Lett.*, vol. 7, pp. 1075–1077, 1995.

[7] J.-X. Cai, K.-M. Feng, X. Chen, A. E. Willner, D. A. Smith, C.-H. Lee, and Y.-J. Chen, "Experimental demonstration of dynamic high-speed equalization of three WDM channels using acoustooptic modulators and a wavelength demultiplexer," *IEEE Photon. Technol. Lett.*, vol. 9., pp. 678–680, 1997.

[8] A. R. Vellekoop and M. K. Smit, "Four-channel integrated-optic wavelength demultiplexer with weak polarization dependence," J. Lightwave Technol., vol. 9., pp. 310–314, 1991.

[9] H. Takahashi, S. Suzuki, K. Kato, and I. Nishi, "Arrayed-waveguide grating for wavelength division multi/demultiplexer with nanometer resolution," Electron. Lett., vol. 26, pp. 87–88, 1990.

[10] C. Dragone, "An N×N optical multiplexer using a planar arrangement of two star couplers," IEEE Photon. Technol. Lett., vol. 3, pp. 812–815, 1991.

[11] J.-F. Vinchant, J. A. Cavailles, M. Erman, P. Jarry, and M. Renaud, "InP/GaInAsP guided-wave phase modulators based on carrier-induced effects: theory and experiment," *J. Lightwave Technol.*, vol. 10, pp. 63–69, 1992.

[12] C. Dragone, "Efficient N×N star couplers using Fourier optics," *J. Lightwave Technol.*, vol. 7, pp. 479–489, 1989.

[13] C. R. Doerr, R. Monnard, C. H. Joyner, and L. W. Stulz, "Simultaneous cw operation of shared angular dispersive element WDM lasers," *IEEE Photon. Technol. Lett.*, vol. 10, pp. 501–503, 1998.

What is claimed is:

1. A chromatically variable transmissivity optical apparatus comprising
a first coupler having an input port for receiving a Wavelength Division Multiplexed (WDM) signal and two output ports for outputting first and second WDM signals;
a second coupler having two input ports and an output port for outputting an equalized WDM signal;
a first optical path for coupling a first WDM signal from the first output port of said first coupler to a first input port of said second coupler;
a second optical path for coupling the second WDM signal from a second output port of said first coupler to an input of a wavelength selective phase shifter apparatus for providing a phase shift to each of one or more wavelengths of said second WDM signal so as to change the level of the optical apparatus transmissivity at said one or more wavelengths;
a third optical path for coupling the phase shifted second WDM signal from an output of said phase shifter apparatus to a second input port of said second coupler; wherein
the effective optical path length of the first optical path is equal, to within a few wavelengths, to the sum of the effective optical path length of the second optical path plus the effective optical path length through the wavelength selective phase shifter apparatus plus the effective optical path length of the third optical path; and wherein
said second coupler for combining said first WDM signal with the phase shifted second WDM signal to form the equalized WDM signal.

2. The optical apparatus of claim 1 being a WDM channel equalizer for a WDM signal including wavelengths grouped into a plurality of wavelength channels.

3. The optical apparatus of claim 1 wherein said phase shifter apparatus includes a wavelength demultiplexer for receiving said second WDM signal and outputting a plurality of wavelength passband signals,
array of phase shifters coupled to receive the plurality of wavelength passband signals and to provide an additional phase shift to at least one wavelength passband signal, and
wavelength multiplexer coupled to receive the plurality of wavelength passband signals output from the wavelength selective array of phase shifters and to form the phase shifted second WDM signal.

4. The optical apparatus of claim 3 wherein the multiplexer and demultiplexer are Waveguide Grating Routers (WGRs).

5. The optical apparatus of claim 1 wherein the couplers are selected from a group of couplers consisting of at least an evanescent coupler, a 2 by 2 star coupler, a multimode interference coupler, a fused fiber coupler, a mixing rod coupler, an integrated-optic directional coupler, a beam splitter, a Y-branch, and a GRIN rod directional coupler.

6. The optical apparatus of claim 1 wherein the first and second couplers are 50/50 couplers.

7. The optical apparatus of claim 1 wherein said phase shifter apparatus includes a plurality of phase shifters, each phase shifter including means for controlling its phase shift using an external signal.

8. The optical apparatus of claim 7 wherein each phase shifter control means is selected from a group consisting of at least a current-injected phase shifter and a thermooptic phase shifter.

9. The optical apparatus of claim 1 wherein all of the elements are implemented using a bulk component.

10. The optical apparatus of claim 1 being implemented as an optical device using a material selected from a group consisting of at least InP and Silica.

11. The optical apparatus of claim 1 arranged as a wavelength add-drop circuit in which one or more channels enter a first port of the first coupler and one or more channels enter a second port of the first coupler, and wherein said one or more channels of the first port exit through a first output port of the second coupler and said one or more channels of the second port exit through a second output port of the second coupler.

12. A chromatically variable transmissivity optical apparatus comprising
a coupler having an input port for receiving a Wavelength Division Multiplexed (WDM) signal and two output ports for outputting first and second WDM signals;
a first optical path for coupling said first WDM signal from a first output port of said coupler to only a reflective facet;
said reflective facet for reflecting said first WDM signal back to the first output port of said coupler;
a second optical path for coupling said second WDM signal from a second output port of said coupler to an input of a wavelength selective phase shifter apparatus for providing a phase shift to two or more wavelengths of the second WDM signal;
said selective phase shifter apparatus including multiple phase shifters each coupled over a separate optical path to a second reflective facet;
said second reflective facet for reflecting said phase shifted second WDM signal back to the phase shifter apparatus; and wherein
said coupler combining said reflected first WDM signal with said reflected phase shifted second WDM signal to form an equalized WDM signal which is outputted at a second input port of said coupler.

13. The optical apparatus of claim 12 wherein the first and second facet are part of the same facet.

14. The optical apparatus of claim 12 being a WDM channel equalizer for a WDM signal including wavelengths grouped into a plurality of wavelength channels.

15. The optical apparatus of claim 12 wherein said phase shifter apparatus includes
a wavelength demultiplexer for receiving said second WDM signal and outputting a plurality of wavelength passband signals,
array of phase shifters coupled to receive the plurality of wavelength passband signals and to provide an additional phase shift to at least one wavelength passband signal, and
wavelength multiplexer coupled to receive the plurality of wavelength passband signals output from the wavelength selective array of phase shifters and to form the phase shifted second WDM signal.

16. The optical apparatus of claim 15 wherein the multiplexer and demultiplexer are Waveguide Grating Routers (WGRs).

17. The optical apparatus of claim 12 wherein the coupler is selected from a group of couplers consisting of at least an evanescent coupler, a 2 by 2 star coupler, a multimode interference coupler, a fused fiber coupler, a mixing rod coupler, an integrated-optic directional coupler, a beam splitter, and a GRIN rod directional coupler.

18. The optical apparatus of claim 12 wherein the coupler is a 50/50 coupler.

19. The optical apparatus of claim 12 wherein said phase shifter apparatus includes a plurality of phase shifters, each phase shifter including means for controlling its phase shift using an external signal.

20. The optical apparatus of claim 19 wherein each phase shifter control means is selected from a group consisting of at least a current-injected phase shifter and a thermooptic phase shifter.

21. The optical apparatus of claim 12 being implemented from bulk components.

22. The optical apparatus of claim 12 being implemented as an optical device using a material selected from a group consisting of at least InP and Silica.

23. The optical apparatus of claim 12 wherein the effective path length of the first optical path is substantially equal to the sum of the effective path length of the second optical path plus the effective length through the wavelength selective phase shifter apparatus.

24. The optical apparatus of claim 12 arranged as a wavelength add-drop circuit in which one or more channels enter a first port of the coupler and one or more channels enter a second port of the coupler, and wherein the one or more channels of the first port exit through said first input port of the coupler and the one or more channels of the second port exit through a second input port of the coupler.

25. A method of equalizing a WDM signal comprising the steps of:
receiving a Wavelength Division Multiplexed (WDM) signal and forming therefrom a first and second WDM signals;
providing an equal optical path length, to within a few wavelengths, for said first and second WDM signals;
providing a phase shift to each of one or more wavelengths of said second WDM signal so as to change the level of the optical apparatus transmissivity at said one or more wavelengths; and
combining said first WDM signal with the phase shifted second WDM signal received to form an equalized WDM signal.

* * * * *